(12) United States Patent
Noh et al.

(10) Patent No.: US 10,957,899 B2
(45) Date of Patent: Mar. 23, 2021

(54) METHOD OF PREPARING LITHIUM METAL OXIDE AND METHOD OF MANUFACTURING LITHIUM SECONDARY BATTERY

(71) Applicant: SK INNOVATION CO., LTD., Seoul (KR)

(72) Inventors: Mi Jung Noh, Daejeon (KR); Jik Soo Kim, Daejeon (KR); Kook Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 66 days.

(21) Appl. No.: 16/220,338

(22) Filed: Dec. 14, 2018

(65) Prior Publication Data

US 2019/0190009 A1 Jun. 20, 2019

(30) Foreign Application Priority Data

Dec. 15, 2017 (KR) .................. 10-2017-0173157

(51) Int. Cl.
  *H01M 4/1391* (2010.01)
  *H01M 4/131* (2010.01)
  *H01M 10/0525* (2010.01)
  *H01M 4/04* (2006.01)
  *H01M 4/505* (2010.01)
  *H01M 4/525* (2010.01)
  *H01M 10/058* (2010.01)

(52) U.S. Cl.
  CPC ....... *H01M 4/1391* (2013.01); *H01M 4/0471* (2013.01); *H01M 4/131* (2013.01); *H01M 4/505* (2013.01); *H01M 4/525* (2013.01); *H01M 10/058* (2013.01); *H01M 10/0525* (2013.01); *H01M 4/0404* (2013.01)

(58) Field of Classification Search
  CPC .......... H01M 10/0525; H01M 10/058; H01M 4/0404; H01M 4/0471; H01M 4/131; H01M 4/1391; H01M 4/505; H01M 4/525
  See application file for complete search history.

(56) References Cited

U.S. PATENT DOCUMENTS

| | | | |
|---|---|---|---|
| 9,359,219 B1* | 6/2016 | Motallebi | H01M 4/58 |
| 2011/0256437 A1* | 10/2011 | Katsuki | H01M 4/525 |
| | | | 429/94 |
| 2015/0194662 A1* | 7/2015 | Yang | H01M 4/131 |
| | | | 429/223 |
| 2018/0175449 A1* | 6/2018 | Iriyama | H01M 10/0567 |

FOREIGN PATENT DOCUMENTS

KR  10-0821523 B1  4/2008

* cited by examiner

*Primary Examiner* — Victoria H Lynch
(74) *Attorney, Agent, or Firm* — The PL Law Group, PLLC

(57) ABSTRACT

In a method of preparing a lithium metal oxide, a preliminary lithium metal oxide is prepared. The preliminary lithium metal oxide is washed using an organic washing solution to remove lithium salt impurities. The organic washing solution includes an organic solvent and a multivalent carboxylic acid compound. A minimum distance between oxygen atoms included in different carboxylic acid groups neighboring each other in the multivalent carboxylic acid compound is 220 pm or more.

8 Claims, 4 Drawing Sheets

METHOD OF PREPARING LITHIUM METAL OXIDE AND METHOD OF MANUFACTURING LITHIUM SECONDARY BATTERY

CROSS-REFERENCE TO RELATED APPLICATION AND CLAIM OF PRIORITY

This application claims priority to Korean Patent Applications No. 10-2017-0173157 filed on Dec. 15, 2017 in the Korean Intellectual Property Office (KIPO), the entire disclosure of which is incorporated by reference herein.

BACKGROUND

1. Field

The present invention relates to a method of preparing a lithium metal oxide and a method of manufacturing a lithium secondary battery. More particularly, the present invention relates to a method of preparing a lithium metal oxide and a method of manufacturing a lithium secondary battery using the lithium metal oxide as an active material.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, the secondary battery or a battery pack including the same is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery, and a nickel-based lithium metal oxide may be used as the lithium metal oxide.

As an application of the lithium secondary battery has been expanded, demands of more improved life-span, capacity and operation stability are increased. In a fabrication of the lithium metal oxide, an excess amount of lithium may be used for process convenience and production yield. In this case, non-uniformity of a chemical structure of the cathode active material due to lithium precipitation, lithium salt impurities, etc., may be caused, and the lithium secondary battery having desired capacity and life-span may not be obtained.

For example, Korean Published Patent Application No. 10-0821523 discloses a method of removing the lithium salt impurities by washing a lithium complex metal oxide with water. However, the impurities may not be sufficiently removed by the method, and surface damages of cathode active material particles may be caused during the washing process.

SUMMARY

According to an aspect of the present invention, there is provided a method of preparing a lithium metal oxide having improved operational stability and electrical property.

According to an aspect of the present invention, there is provided a method of manufacturing a lithium secondary battery having improved operational stability and electrical property.

In a method of preparing a lithium metal oxide according to exemplary embodiments, a preliminary lithium metal oxide is prepared. The preliminary lithium metal oxide is washed using an organic washing solution to remove lithium salt impurities. The organic washing solution includes an organic solvent and a multivalent carboxylic acid compound. A minimum distance between oxygen atoms included in different carboxylic acid groups neighboring each other in the multivalent carboxylic acid compound is 220 pm or more.

In some embodiments, the minimum distance in the multivalent carboxylic acid compound may be in a range from 220 pm to about 500 pm.

In some embodiments, the lithium salt impurities may include LiOH and $Li_2CO_3$.

In some embodiments, the multivalent carboxylic acid compound may include at least one of maleic acid, oxalic acid and poly acrylic acid (PAA).

In some embodiments, the organic solvent may include alcohol, and the organic washing solution may not include water.

In some embodiments, before or after washing the preliminary lithium metal oxide using the organic washing solution, the preliminary lithium metal oxide may be fired.

In some embodiments, the lithium metal oxide may include a compound represented by Chemical Formula 1 below.

$$Li_{1+\alpha}Ni_{1-(x+y)}Co_xM_yO_2 \qquad \text{[Chemical Formula 1]}$$

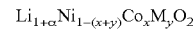

In the Chemical Formula 1 above, $-0.05 \leq \alpha \leq 0.15$, $0.01 \leq x \leq 0.2$, $0 \leq y \leq 0.2$, and M is at least one element selected from Mg, Sr, Ba, B, Al, Si, Mn, Ti, Zr or W.

In a method of manufacturing a lithium secondary battery according to exemplary embodiment, a cathode active material including a lithium metal oxide prepared as described above is prepared. The cathode active material is coated on a cathode current collector to form a cathode. An anode facing the cathode with respect to a separation layer is formed.

According to exemplary embodiments of the present invention, a preliminary lithium metal oxide may be washed using an organic washing solution to remove lithium salt impurities remaining on a surface of the preliminary lithium metal oxide. The organic washing solution may include a multivalent carboxylic acid compound so that an alkaline impurity such as lithium hydroxide may be effectively removed.

The multivalent carboxylic acid compound may remove the lithium salt impurities by a capturing activity such as a chelating activity. In exemplary embodiments, a distance between neighboring oxygen atoms of carboxylic groups included in the multivalent carboxylic acid compound may be adjusted to enhance a removal efficiency of the lithium salt impurities.

In some embodiments, the organic washing solution may not include water, and may include an alcohol-based compound as a solvent. Thus, surface damages of the lithium metal oxide and initial resistance increase of an electrode by water may be prevented, and the removal of the impurities may be effectively implemented.

DETAILED DESCRIPTION

According to exemplary embodiments of the present invention, a method of preparing a lithium metal oxide using an organic washing solution that includes a multivalent carboxylic acid compound is provided. A cathode active material and a lithium secondary battery including the lithium metal oxide and having high purity and reliability are also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The term "lithium metal oxide" used herein indicates a complex oxide including lithium and at least one metal except for lithium. In exemplary embodiments, the lithium metal oxide may include a nickel-based lithium oxide.

For example, the nickel-based lithium oxide may be represented by Chemical Formula 1 below.

$$Li_{1+\alpha}Ni_{1-(x+y)}Co_xM_yO_2 \quad \text{[Chemical Formula 1]}$$

In the Chemical Formula 1 above, $-0.05 \leq \alpha \leq 0.15$, $0.01 \leq x \leq 0.2$, $0 \leq y \leq 0.2$, and M may be at least one element selected from Mg, Sr, Ba, B, Al, Si, Mn, Ti, Zr or W. In an embodiment, $0.01 \leq x \leq 0.20$, $0.01 \leq y \leq 0.15$.

In exemplary embodiments, the lithium metal oxide may be used as a cathode active material of a lithium secondary battery. For example, in the lithium metal oxide of Chemical Formula 1, nickel (Ni) may be an element related to a capacity of the lithium secondary battery. As an amount of nickel becomes greater, a capacity and a power output of the lithium secondary battery may be improved. However, if the amount of nickel is excessively increased, a life-span and an electrical stability of the battery may be degraded.

For example, cobalt (Co) may be an element related to a conductivity and a resistance of the lithium secondary battery. In an embodiment, M may include manganese (Mn), and Mn may be an element related to mechanical and electrical stability of the lithium secondary battery.

In exemplary embodiments, the lithium metal oxide may include a nickel-cobalt-manganese based compound, and the cathode active material having improved capacity, power output, low resistance and life-span may be provided.

Figure 1:
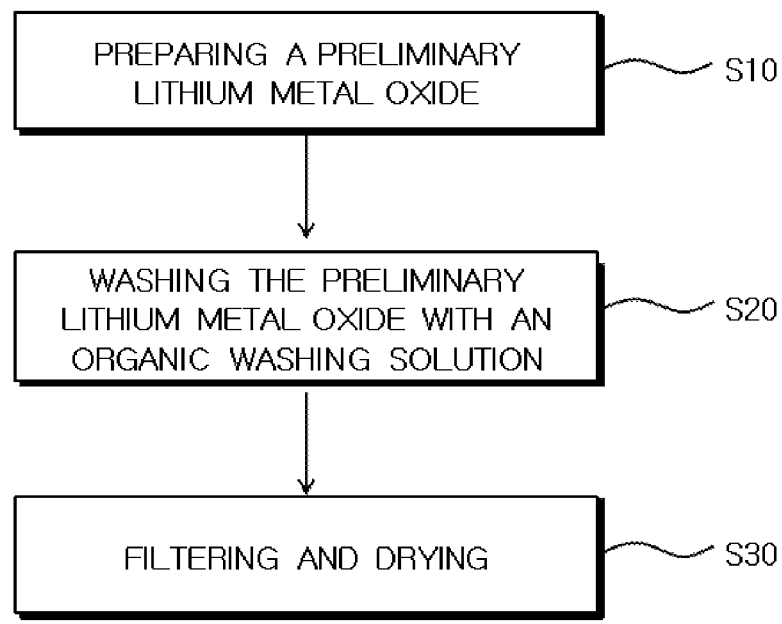
FIG. 1 is a flow chart showing a method of preparing a lithium metal oxide in accordance with exemplary embodiments.

FIG. 1 is a flow chart showing a method of preparing a lithium metal oxide in accordance with exemplary embodiments.

Referring to FIG. 1, a preliminary lithium metal oxide may be prepared (e.g., in an operation of S10).

The preliminary lithium metal oxide may include a nickel-based lithium oxide. For example, the preliminary lithium metal oxide may be prepared by reacting a lithium precursor and a nickel precursor. The lithium precursor and the nickel precursor may include an oxide or a hydroxide of lithium and nickel, respectively. For example, the lithium precursor and the nickel precursor may be reacted with each other via a co-precipitation in a solution to form the preliminary lithium metal oxide.

In some embodiments, another metal precursor (e.g., a cobalt precursor, a manganese precursor, etc.) may be also reacted in addition to the lithium precursor and the nickel precursor. In this case, the preliminary lithium metal oxide having a total composition of the Chemical Formula 1 above may be synthesized. In some embodiments, the lithium precursor and a nickel-cobalt-manganese precursor (e.g., nickel-cobalt-manganese hydroxide) may be reacted with each other.

In some embodiments, an annealing process or a firing process may be performed after synthesizing the preliminary lithium metal oxide. For example, the annealing or firing process may be performed at a temperature in a range from about 600° C. to about 800° C. In an embodiment, a temperature may be increased to a target firing temperature by a predetermined temperature increase rate (e.g., a temperature increase period), and then the firing process may be performed for about 6 to about 12 hours (e.g., a temperature maintaining period).

Metals precipitated on a surface of the preliminary lithium metal oxide may be oxidized again by the firing process, and merged with or re-synthesized into an inside of the preliminary lithium metal oxide as an oxide.

In some embodiments, the firing process may be performed in an oxidizing atmosphere. For example, oxygen may be provided by a predetermined flow rate for the temperature increase period and/or the temperature maintaining period into a firing chamber in which the preliminary lithium metal oxide is loaded.

The prepared preliminary lithium metal oxide may be washed using an organic washing solution (e.g., in an operation of S20).

Non-reacted precursors may be remained or precipitated on the surface of the preliminary lithium metal oxide obtained by the solution-based reaction as described above. Further, impurities or solution molecules generated during the synthesis may be remained on the preliminary lithium metal oxide.

In some embodiments, an excess amount of the lithium precursor may be used for improving production yield or process stability in the synthesis of the preliminary lithium metal oxide. In this case, lithium salt impurities including lithium hydroxide (LiOH) and lithium carbonate ($Li_2CO_3$) may be remained on the surface of the preliminary lithium metal oxide.

In exemplary embodiments, the organic washing solution may include an organic solvent and a multivalent carboxylic acid compound mixed or dissolved in the organic solvent. The lithium salt impurities remaining on the surface of the preliminary lithium metal oxide may be removed by a washing process using the organic washing solution.

The organic solvent may include an alcohol-based solvent. In some embodiments, a C2 to C6 alcohol may be used as the organic solvent.

If a C1 methanol is used as the organic solvent, a solubility of the multivalent carboxylic acid compound may be degraded as a carbon number of the multivalent carboxylic acid compound becomes greater. If a carbon number of alcohol is 6 or more, a capturing activity of the lithium salt impurities by the multivalent carboxylic acid compound may be hindered. Preferably, ethanol may be used as the organic solvent.

The multivalent carboxylic acid compound may include a plurality of carboxylic acid groups in a molecule. In exemplary embodiments, the multivalent carboxylic acid compound may provide a chemical tong chelating or capturing the lithium salt impurities.

For example, hands of the chemical tong may be defined by neighboring carboxylic acid groups included in the multivalent carboxylic acid compound. Compounds having a tong width capable of capturing the lithium salt impurities may be selected as the multivalent carboxylic acid compound.

As described above, the lithium salt impurities may include LiOH, and may further include $Li_2CO_3$ generated when LiOH is exposed to air. The organic washing solution according to exemplary embodiments may include the multivalent carboxylic acid compound so that the alkaline lithium salt impurities may be effectively neutralized.

Further, the neighboring carboxylic acid groups in the multivalent carboxylic acid compound may serve as the chemical tong so that the lithium salt impurities may be chelated or may be captured as complex-salts.

A total molecular width of LiOH is about 166 pm when a bonding length (a length of Li—O and a length of O—H) and a bonding angle are considered. A total molecular width of $Li_2CO_3$ is about 440 pm when a bonding length (lengths of two Li—O and a length of O=C=O) and a bonding angle are considered, and a width of a group corresponding to one lithium ion (Li—O=O, hereinafter indicated as a lithium ion group) is about 220 pm.

Thus, according to exemplary embodiments, the multivalent carboxylic acid compound having a chemical tong width of about 220 pm or more so that both LiOH and $Li_2CO_3$ may be captured and removed. A chemical tong width in the multivalent carboxylic acid compound may be defined as a minimum distance between oxygen atoms included in different carboxylic acid groups neighboring each other.

In some embodiments, the multivalent carboxylic acid compound having the chemical tong width of about 220 pm to about 500 pm may be used. If the chemical tong width exceeds about 500 pm, the chelating effect with respect to the lithium salt impurities may be reduced.

Figure 2:
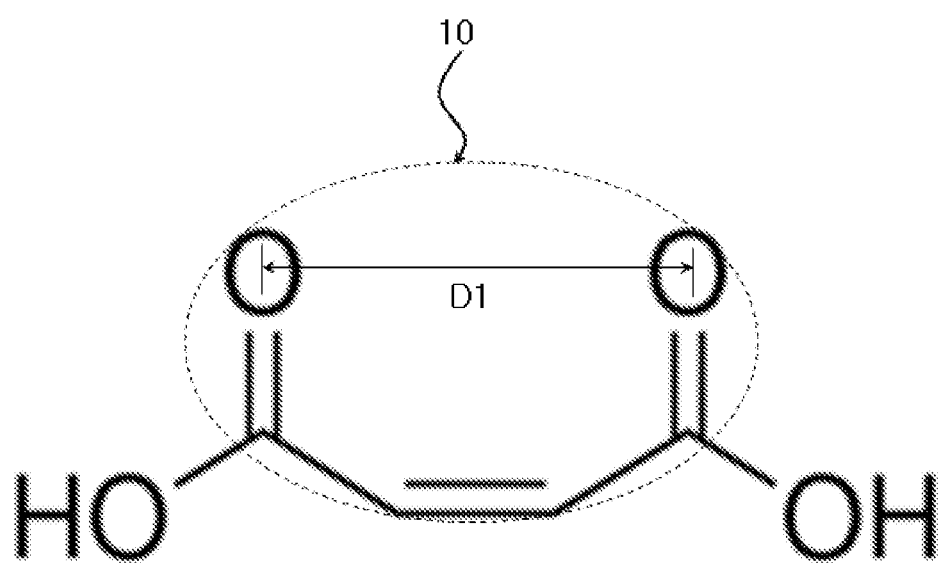
FIGS. 2 to 4 are schematic views illustrating a width of a chemical tong in a multivalent carboxylic acid compound in accordance with exemplary embodiments.
Figure 3:
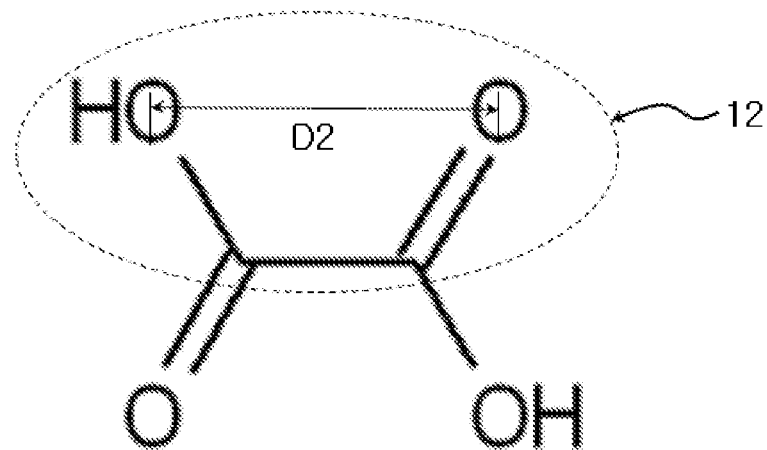
Figure 4:
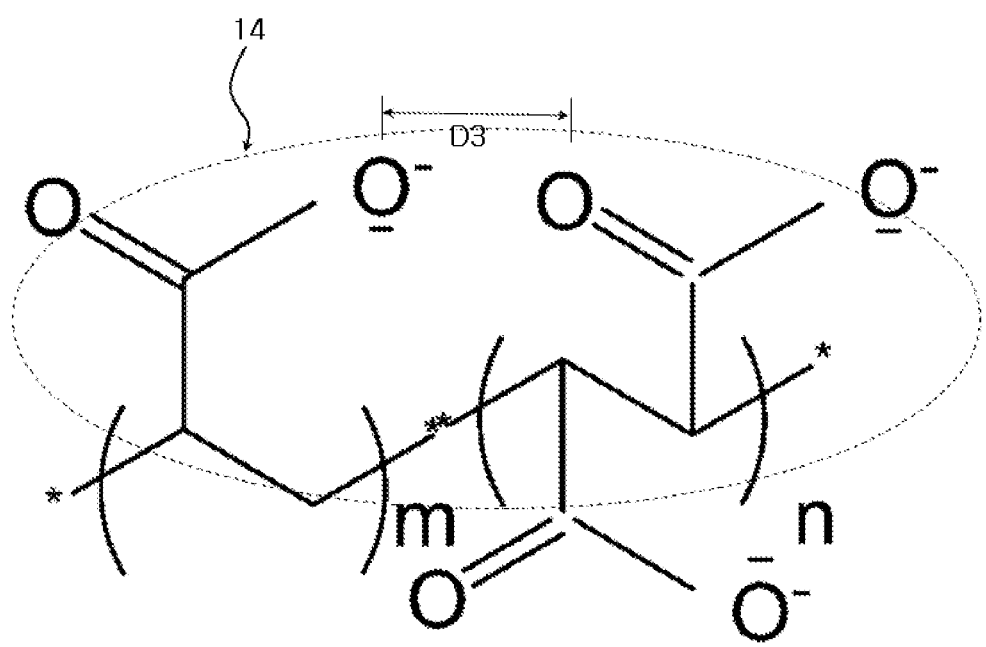

FIGS. 2 to 4 are schematic views illustrating a width of a chemical tong in a multivalent carboxylic acid compound in accordance with exemplary embodiments.

In exemplary embodiments, the multivalent carboxylic acid compound having the chemical tong width within the above-mentioned range may include maleic acid, oxalic acid and/or poly acrylic acid (PAA).

Referring to FIG. 2, in some embodiments, the multivalent carboxylic acid compound may include maleic acid.

In maleic acid, a chemical tong 10 may be defined by a pair of carbonyl groups (—C=O—) neighboring each other and an ethylene group (—CH=CH—) therebetween. A chemical tong width D1 may be defined as a distance between oxygen atoms included in the carbonyl groups.

The chemical tong width D1 provided by maleic acid is about 401 pm, and thus both LiOH and $Li_2CO_3$ may be effectively captured and removed.

Referring to FIG. 3, in some embodiments, the multivalent carboxylic acid compound may include oxalic acid.

In oxalic acid, two carboxylic acid groups (a first carboxylic acid group and a second carboxylic acid group) may be directly bonded via carbonyl carbon atoms. A chemical tong 12 may be defined by a hydroxyl group and the carbonyl carbon atom included in the first carboxylic acid group, and the carbonyl group included in the second carboxylic acid group.

A chemical tong width D2 may be defined as a distance between an oxygen atom in the hydroxyl group of the first carboxylic acid group and an oxygen atom in the carbonyl group of the second carboxylic acid group.

The chemical tong width D2 provided by oxalic acid is about 287 pm, and thus both LiOH and $Li_2CO_3$ may be effectively removed through capturing the lithium ion group.

Referring to FIG. 4, in some embodiments, the multivalent carboxylic acid compound may include PAA. In FIG. 4, m and n are integers indicating a repeating number.

In PAA, a plurality of carboxylic acid groups may be repeatedly arranged along a hydrocarbon backbone. A chemical tong 14 may be defined by the neighboring carboxylic acid groups (e.g., a first carboxylic acid group and a second carboxylic acid group) in PAA and a portion of the hydrocarbon backbone between the carboxylic acid groups.

A chemical tong width D3 may be defined as a distance between a carbonyl oxygen included in the first carboxylic acid group and a hydroxyl oxygen included in the second carboxylic acid group. As illustrated in FIG. 4, the hydroxyl oxygen may be present as an anion.

The chemical tong width D3 provided by PAA is about 400 pm, and thus both LiOH and $Li_2CO_3$ may be effectively removed through capturing the lithium ion group.

Figure 5:
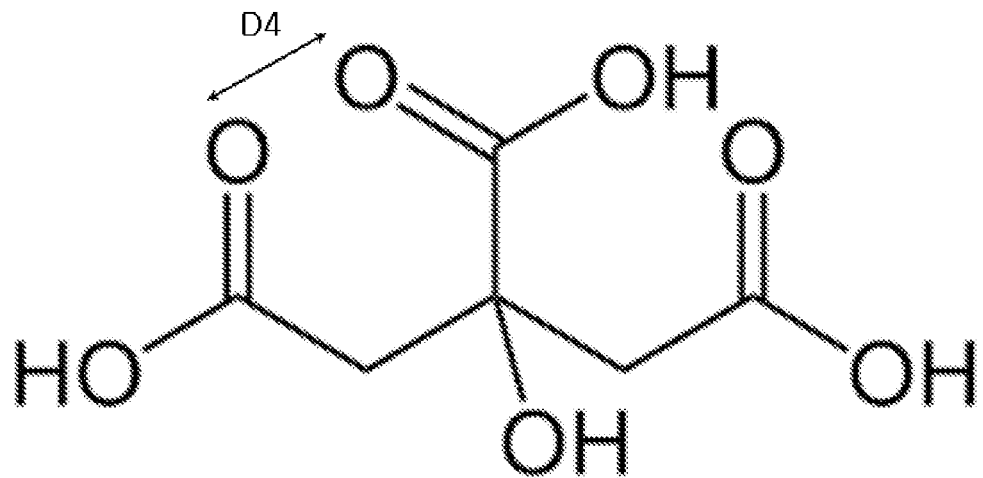
FIG. 5 is a schematic view illustrating a width of a chemical tong in a multivalent carboxylic acid compound of a comparative example.

FIG. 5 is a schematic view illustrating a width of a chemical tong in a multivalent carboxylic acid compound of a comparative example.

For example, in the comparative example, if citric acid is used as the multivalent carboxylic acid compound, 3 carboxylic acid groups are included. A chemical tong width D4 is defined by a distance between carbonyl oxygen atoms neighboring each other, and the distance may be decreased due to a stereochemical arrangement of the carboxylic acid groups.

In citric acid, the chemical tong width is about 208 pm, and LiOH may be captured by citric acid. However, a sufficient width for capturing lithium ion groups of $Li_2CO_3$ is not provided by citric acid.

According to exemplary embodiments as described above, the multivalent carboxylic acid compound (e.g., maleic acid, oxalic acid and/or PAA) having the chemical tong width capable of removing both LiOH and $Li_2CO_3$ may be used so that the lithium salt impurities may be effectively removed by neutralization and chelating.

Further, the alcohol-based organic solvent excluding water may be used so that compatibility with the multivalent carboxylic acid compound may be enhanced and an initial resistance increase due to surface damages of the lithium metal oxide may be prevented.

Referring to FIG. 1 again, in, e.g., an operation of S30, after removing the lithium salt impurities through the washing process using the organic washing solution, the washed preliminary lithium metal oxide may be filtered through a filter to remove the organic washing solution capturing the lithium salt impurities. Subsequently, a drying process may be further performed so that a lithium metal oxide from which the lithium salt impurities is removed may be obtained from the preliminary lithium metal oxide. The drying process may be performed at a temperature in a range from about 200° C. to about 300° C.

Figure 6:
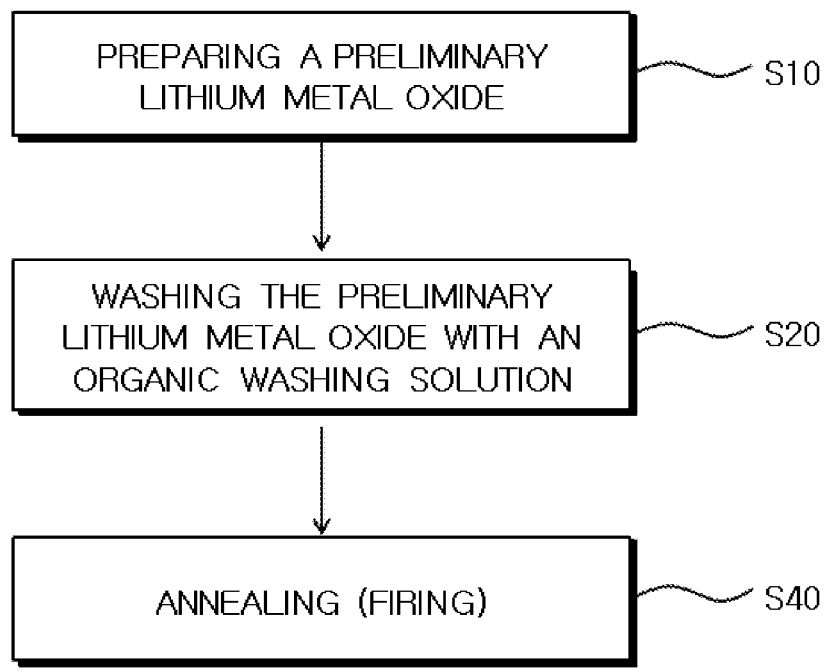
FIG. 6 is a flow chart showing a method of preparing a lithium metal oxide in accordance with some exemplary embodiments.

FIG. 6 is a flow chart showing a method of preparing a lithium metal oxide in accordance with some exemplary embodiments. Detailed descriptions substantially the same as or similar to those described with reference to FIG. 1 are omitted herein.

Referring to FIG. 6, a preliminary lithium metal oxide may be prepared as described in FIG. 1 (e.g., in an operation of S10), and the preliminary lithium metal oxide may be washed using an organic washing solution that may include the multivalent carboxylic acid compound as described above (e.g., in an operation of S20).

After the washing process, an annealing process such as a firing process may be performed on the preliminary lithium metal oxide from which lithium salt impurities may be removed by the organic washing solution to achieve a lithium metal oxide (e.g., in an operation of S40).

The firing process may be performed before the washing process using the organic washing solution as described in FIG. 1. Alternatively, the firing process may be performed after the washing process using the organic washing solution as described in FIG. 6. In this case, the lithium salt impurities remaining on a surface of a lithium metal oxide that may not be removed by the washing process may be merged again into the lithium metal oxide particle.

For example, the firing process may be performed at a temperature in a range from about 600° C. to about 800° C., and may include a temperature increase period and a temperature maintaining period. In some embodiments, the firing process may be performed in an oxidizing atmosphere.

After the firing process in the temperature maintaining period, a cooling at a room temperature may be performed to obtain a lithium metal oxide having desired composition and property.

According to exemplary embodiments, a method of manufacturing a cathode active material or a lithium secondary battery utilizing the method of preparing the lithium metal oxide is also provided.

Figure 7:
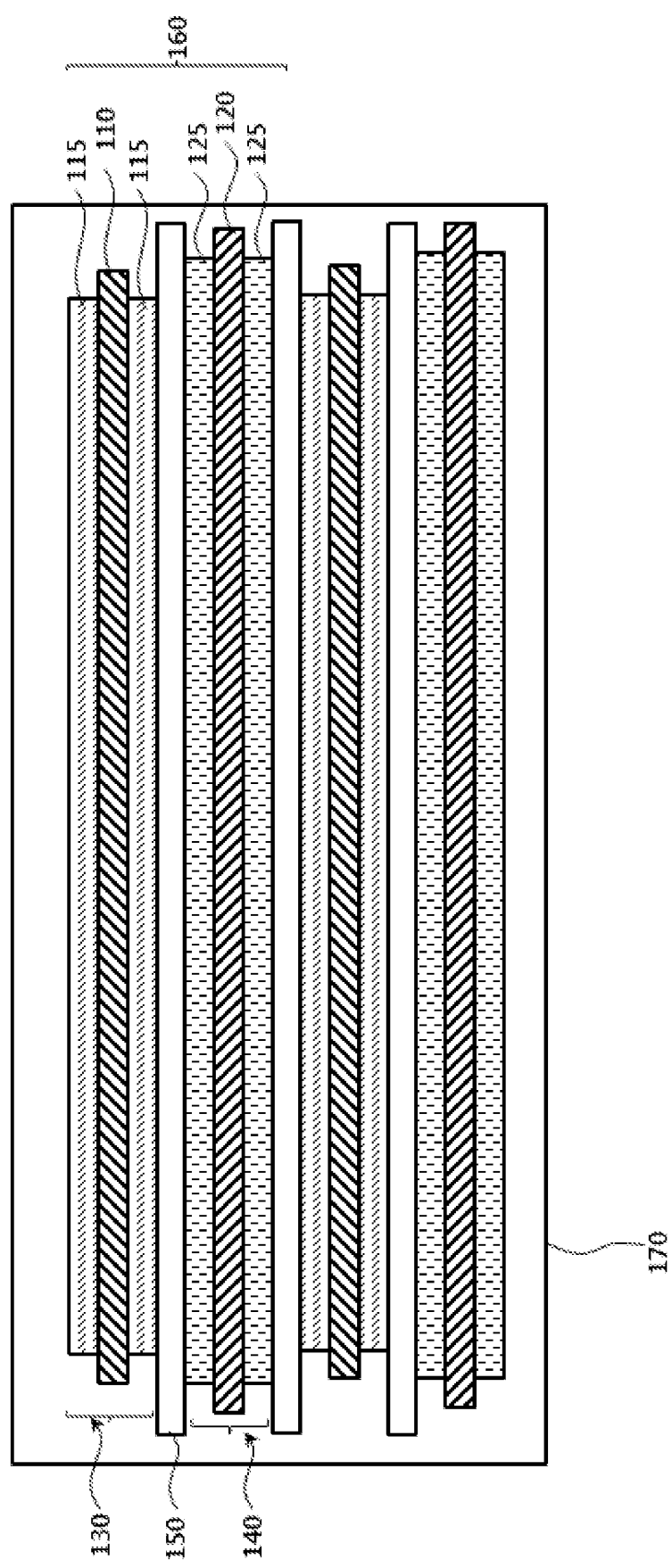
FIG. 7 is a schematic cross-sectional view illustrating a lithium secondary battery.

FIG. 7 is a schematic cross-sectional view illustrating a lithium secondary battery.

Referring to FIG. 7, a lithium secondary battery may include a cathode 130, an anode 140 and a separation layer 150 interposed therebetween.

The cathode 130 may include a cathode active material layer 115 formed by coating a cathode active material on a cathode current collector 110. In exemplary embodiments, the cathode active material may be prepared using the lithium metal oxide obtained by processes as described with reference to FIG. 1 or FIG. 6.

In some embodiments, the lithium metal oxide may include a compound as represented by the above-mentioned Chemical Formula 1. The cathode active material may include the lithium metal oxide from which lithium salt impurities such as LiOH and/or $Li_2CO_3$ may be substantially removed using an organic washing solution containing the multivalent carboxylic acid compound as described with reference to FIGS. 2 to 4.

Thus, an outgassing (e.g., a generation of $CO_2$) during an operation of the lithium secondary battery and reduction of an electrode density caused by the lithium salt impurities may be prevented or avoided. Therefore, properties related to power output and capacity, and long-term operational stability of the battery may be enhanced.

Additionally, the organic washing solution substantially devoid of water may be used so that phase change and resistance increase due to water permeation into the cathode active material may be suppressed.

For example, the lithium metal oxide may be mixed and stirred together with a binder, a conductive additive and/or a dispersing agent in a solvent to form a slurry. The slurry may be coated on the cathode current collector 110, and pressed and dried to obtain the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidene fluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115 may be reduced, and an amount of the cathode active material may be relatively increased. Thus, capacity and power output of the lithium secondary battery may be further improved.

The conductive additive may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In example embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersing agent in a solvent to form a slurry. The slurry may be coated on the anode current collector 120, and pressed and dried to obtain the anode 140.

The binder and the conductive additive substantially the same as or similar to those as mentioned above may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation. Therefore, the enhancement of power and stability by the removal of the lithium salt impurities may be effectively implemented.

In example embodiments, an electrode cell 160 may be defined by the cathode 130, the anode 140 and the separation layer 150, and a plurality of the electrode cells 160 may be stacked to form an electrode assembly having, e.g., a jelly roll shape. For example, the electrode assembly may be formed by winding, laminating or folding of the separation layer 150.

The electrode assembly may be accommodated in an external case 170 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the external case 170. The electrode tabs may be welded together with the one end of the external case 170 to form an electrode lead exposed at an outside of the external case 170.

The lithium secondary battery may be fabricated into a cylindrical shape using a can, a prismatic shape, a pouch shape, a coin shape, etc.

For example, the lithium secondary battery as illustrated in FIG. 7 may be obtained by the above-described processes. The cathode active material layer 115 of the lithium secondary battery may include the lithium metal oxide from which the lithium salt impurities may be substantially removed, and thus may have high reliability.

Thus, the lithium secondary battery having enhanced life-span and long-term stability may be achieved while preventing a reduction of capacity and average voltage by the lithium salt impurities.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

In Examples and Comparative Examples, preliminary lithium metal oxides having a composition as shown in Table 1 below were prepared, and a washing process was performed to remove lithium salt impurities.

In a synthesis of the preliminary lithium metal oxide, lithium hydroxide as a lithium precursor and Ni—Co—Mn hydroxide as a metal precursor were uniformly mixed by a molar ratio of 1.05:1 to form a mixture. The mixture was introduced in a firing chamber. The chamber was heated to a temperature between 700° C. and 800° C. at a rate of 2° C./min while providing oxygen at a flow rate of 10 mL/min, and maintained at the increased temperature for 10 hours. After the firing, the chamber was naturally cooled to a room temperature, and the preliminary lithium metal oxide was obtained as a cathode active material after grinding and distribution processes.

Examples

A multivalent carboxylic acid compound as shown in Table 1 was dissolved in 100 ml of ethanol (EtOH) to prepare an organic washing solution. The preliminary lithium metal oxide was put in the organic washing solution, and then stirred for 10 minutes and filtered. The filtered preliminary lithium metal oxide was vacuum-dried at 250° C. for 12 hours to obtain a lithium metal oxide.

Comparative Examples

In Comparative Examples 1 and 2, an additional washing treatment was not performed.

In Comparative Example 3, processes the same as those of Examples except that distilled water (DIW) was used instead of the organic washing solution.

In Comparative Example 4, processes the same as those of Examples except that an aqueous washing solution including 100 ml of DIW and 1 g of maleic acid dissolved therein was used instead of the organic washing solution.

In Comparative Example 5, processes the same as those of Examples except that 100 ml of EtOH was used instead of the organic washing solution.

In Comparative Example 6, processes the same as those of Examples except that a washing solution including 100 ml of EtOH and 1 g of citric acid dissolved therein was used instead of the organic washing solution.

TABLE 1

| | Preliminary Lithium Metal Oxide (cathode active material) | Solvent | Additive (washing agent) |
|---|---|---|---|
| Example 1 | $LiNi_{0.88}Co_{0.09}Mn_{0.03}O_2$ | EtOH | polyacrylic acid (PAA) |
| Example 2 | $LiNi_{0.88}Co_{0.09}Mn_{0.03}O_2$ | EtOH | maleic acid |
| Example 3 | $LiNi_{0.88}Co_{0.09}Mn_{0.03}O_2$ | EtOH | oxalic acid |
| Example 4 | $LiNi_{0.7}Co_{0.15}Mn_{0.15}O_2$ | EtOH | maleic acid |
| Example 5 | $LiNi_{0.8}Co_{0.1}Mn_{0.1}O_2$ | EtOH | maleic acid |
| Example 6 | $LiNi_{0.93}Co_{0.05}Mn_{0.02}O_2$ | EtOH | maleic acid |
| Comparative Example 1 | $LiNi_{0.88}Co_{0.09}Mn_{0.03}O_2$ | — | — |
| Comparative Example 2 | $LiNi_{0.93}Co_{0.05}Mn_{0.02}O_2$ | — | — |

TABLE 1-continued

|  | Preliminary Lithium Metal Oxide (cathode active material) | Solvent | Additive (washing agent) |
|---|---|---|---|
| Comparative Example 3 | $LiNi_{0.88}Co_{0.09}Mn_{0.03}O_2$ | DIW | — |
| Comparative Example 4 | $LiNi_{0.88}Co_{0.09}Mn_{0.03}O_2$ | DIW | maleic acid |
| Comparative Example 5 | $LiNi_{0.88}Co_{0.09}Mn_{0.03}O_2$ | EtOH | — |
| Comparative Example 6 | $LiNi_{0.88}Co_{0.09}Mn_{0.03}O_2$ | EtOH | citric acid |
| Comparative Example 7 | $LiNi_{0.88}Co_{0.09}Mn_{0.03}O_2$ | EtOH | tartaric acid |

Experimental Example (1) Measurement of Remaining Lithium Salt Impurities 2.0 g of each lithium metal oxide according to Examples and Comparative Examples was quantified in a 250 mL flask with 110 g of deionized water, and then a magnetic bar was put and stirred for 10 minutes at a rate of 4 rpm. The mixture was filtered using a pressure reducing flask and 100 g of the mixture was collected. The collected mixture was automatically titrated with 0.1N HCl in an auto titrator to measure amounts of LiOH and $Li_2CO_3$.

(2) Evaluation of Battery Properties 2-1) Fabrication of Secondary Battery Cell

Each cathode active material (lithium metal oxide) of Examples and Comparative Examples, carbon black as a conductive additive and PVDF as a binder were mixed by a weight ratio of 92:5:3 to form a slurry. The slurry was uniformly coated on an aluminum foil having a thickness of 15 μm and vacuum-dried at 130° C. to form a cathode for a lithium secondary battery. An electrode assembly was formed using the cathode, a lithium foil as a counter electrode, a porous polyethylene layer (thickness: 21 μm) as a separator. A battery cell having a coin half-cell shape was fabricated by a commonly known process using the electrode assembly and an electrolyte solution in which 1.0 M of LiPF6 was dissolved in a solution including ethylene carbonate and ethyl methyl carbonate by a volume ratio of 3:7.

2-2) Measurement of 0.1C Initial Charging/Discharging Capacity

One cycle of a charging (CC/CV 0.1C 4.3V 0.05CA CUT-OFF) and a discharging (CC 0.1C 3.0V CUT-OFF) was performed to the battery cells of Examples and Comparative Examples, and initial discharging capacity were measured (CC: constant current, CV: Constant voltage)

2-3) Measurement of 0.1C Initial Efficiency

The initial discharging capacity measured in the above 2-2) was denominated by an initial charging amount to measure an initial efficiency as a percentage value.

2-4) Measurement of 1C Discharging Capacity

A charging (CC/CV 0.5C 4.3V 0.05CA CUT-OFF) and a discharging (CC 1.0C 3.0V CUT-OFF) was performed to the battery cells of Examples and Comparative Examples.

2-5) Measurement of Capacity Retention Ratio 300 cycles of the charging and discharging performed for measuring the 1C discharging capacity above were repeated. A discharging capacity at the 300th cycle was denominated by the discharging capacity at the first cycle to measure a capacity retention ratio as a percentage value.

The results are shown in Table 2 below.

TABLE 2

|  | Amount of LiOH (ppm) | Amount of $Li_2CO_3$ (ppm) | 0.1 C initial capacity and efficiency | | | 1 C | Capacity Retention Ratio |
|---|---|---|---|---|---|---|---|
|  |  |  | Charging (mAh/g) | Discharging (mAh/g) | Efficiency | Discharging Capacity | (300th) (%) |
| Example 1 | 2449 | 1529 | 234 | 213 | 91% | 190 | 77% |
| Example 2 | 1680 | 2680 | 233 | 214 | 92% | 189 | 78% |
| Example 3 | 2474 | 1410 | 234 | 213 | 91% | 189 | 78% |
| Example 4 | 1260 | 1150 | 217 | 195 | 90% | 171 | 85% |
| Example 5 | 1828 | 1790 | 223 | 203 | 91% | 181 | 82% |
| Example 6 | 2020 | 2450 | 236 | 217 | 92% | 192 | 69% |
| Comparative Example 1 | 10340 | 6580 | 232 | 212 | 91% | 186 | 53% |
| Comparative Example 2 | 16520 | 13010 | 236 | 216 | 92% | 193 | 25% |
| Comparative Example 3 | 340 | 1890 | 234 | 210 | 90% | 184 | 29% |
| Comparative Example 4 | 290 | 1380 | 233 | 210 | 90% | 185 | 37% |
| Comparative Example 5 | 10140 | 5870 | 232 | 212 | 91% | 187 | 56% |
| Comparative Example 6 | 8140 | 1870 | 232 | 210 | 91% | 185 | 60% |
| Comparative Example 7 | 10300 | 3580 | 234 | 209 | 89% | 183 | 42% |

Referring to Table 2 above, in Examples in which the organic washing solution including maleic acid, oxalic acid or PAA as the multivalent carboxylic acid compound dissolved in an ethanol solvent, an amount of the lithium salt impurities was decreased, and improved capacity and life-span properties were achieved.

In Comparative Examples 1 and 2 in which the washing solution was not performed, an amount of the impurities was drastically increased and the life-span property (capacity retention ratio) was also degraded.

In Comparative Examples 3 and 4 using water as a solvent, an amount of the lithium salt impurities was decreased. However, the life-span property was explicitly degraded due to damages of the cathode active material by water.

In Comparative Examples 5, 6 and 7 in which the multivalent carboxylic acid compound was not used, or citric acid and tartaric acid were used, the lithium salt impurities were not sufficiently removed and the life-span property was also degraded.

What is claimed is:

1. A method of preparing a lithium metal oxide, the method comprising:
   preparing a preliminary lithium metal oxide; and
   washing the preliminary lithium metal oxide using an organic washing solution to remove lithium salt impurities, wherein the organic washing solution includes an organic solvent and a multivalent carboxylic acid compound, and a minimum distance between oxygen atoms included in different carboxylic acid groups neighboring each other in the multivalent carboxylic acid compound is equal to or greater than 220 pm; and
   filtering the washed preliminary lithium metal oxide to remove the multivalent carboxylic acid compound capturing the lithium salt impurities from the washed preliminary lithium metal oxide.

2. The method according to claim 1, wherein the minimum distance is in a range from 220 pm to about 500 pm.

3. The method according to claim 2, wherein the lithium salt impurities include LiOH and $Li_2CO_3$.

4. The method according to claim 1, wherein the multivalent carboxylic acid compound includes at least one selected from the group consisting of maleic acid, oxalic acid and poly acrylic acid (PAA).

5. The method according to claim 1, wherein the organic solvent includes alcohol.

6. The method according to claim 1, further comprising, before or after washing the preliminary lithium metal oxide using the organic washing solution, firing the preliminary lithium metal oxide.

7. The method according to claim 1, wherein the lithium metal oxide includes a compound represented by Chemical Formula 1 below:

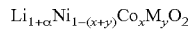    Chemical Formula 1 wherein $-0.05 \leq \alpha \leq 0.15$, $0.01 \leq x \leq 0.2$, $0 \leq y \leq 0.2$, and M is at least one element selected from the group consisting of Mg, Sr, Ba, B, Al, Si, Mn, Ti, Zr, and W.

8. A method of manufacturing a lithium secondary battery, the method comprising:
   preparing a cathode active material including the lithium metal oxide prepared according to claim 1;
   coating the cathode active material on a cathode current collector to form a cathode; and
   forming an anode facing the cathode with respect to a separation layer.

* * * * *